(12) United States Patent
Santaella et al.

(10) Patent No.: US 11,034,283 B2
(45) Date of Patent: *Jun. 15, 2021

(54) DEVICE AND METHOD FOR CONTROLLING LIGHT SOURCES IN MOTOR VEHICLES

(71) Applicant: VALEO ILUMINACION, Martos (ES)

(72) Inventors: Juan-Jose Santaella, Martos (ES); Miguel-Angel Pena, Martos (ES); Maria Marin, Martos (ES); Antonio Domingo Illan, Martos (ES); Juan Lara-Cabeza, Martos (ES)

(73) Assignee: VALEO ILUMINACION, Martos (ES)

(*) Notice: Subject to any disclaimer, the term of this patent is extended or adjusted under 35 U.S.C. 154(b) by 0 days.

This patent is subject to a terminal disclaimer.

(21) Appl. No.: 16/845,718

(22) Filed: Apr. 10, 2020

(65) Prior Publication Data

US 2020/0238893 A1   Jul. 30, 2020

Related U.S. Application Data

(63) Continuation of application No. 16/009,659, filed on Jun. 15, 2018, now Pat. No. 10,661,702.

(30) Foreign Application Priority Data

Jun. 16, 2017   (EP) .................................... 17382370

(51) Int. Cl.
*B60Q 1/08*   (2006.01)
*B60Q 1/00*   (2006.01)
*B60Q 1/14*   (2006.01)

(52) U.S. Cl.
CPC ............. *B60Q 1/08* (2013.01); *B60Q 1/0076* (2013.01); *B60Q 1/1423* (2013.01);
(Continued)

(58) Field of Classification Search
CPC .......... B60Q 1/1423; B60Q 1/50; B60Q 3/82; B60Q 1/38; B60Q 2900/30; B60Q 9/002;
(Continued)

(56) References Cited

U.S. PATENT DOCUMENTS

| 8,525,416 B2 | 9/2013 | Roger et al. |
| 2007/0194905 A1* | 8/2007 | Herrig ..................... G08B 5/38 340/471 |

(Continued)

*Primary Examiner* — Wei (Victor) Y Chan
(74) *Attorney, Agent, or Firm* — Oblon, McClelland, Maier & Neustadt, L.L.P.

(57) ABSTRACT

Device for controlling at least a first light source of a motor vehicle, the motor vehicle at least comprising the first light source being configured to provide a first light function and a second light source configured to provide a second light function, the device comprising: electrical means configured to detect activation of the second light source, and to deactivate the first light source after detection of activation of the second light source. Also, method for controlling at least a first light source of a motor vehicle, the motor vehicle comprising the first light source being configured to provide a first light function and a second light source configured to provide a second light function, the method comprising: electrically detecting activation of the second light source; and electrically deactivating the first light source after detecting activation of the second light source.

14 Claims, 4 Drawing Sheets

(52) U.S. Cl.
 CPC .... *B60Q 2300/14* (2013.01); *B60Q 2300/142* (2013.01); *B60Q 2400/30* (2013.01)

(58) Field of Classification Search
 CPC ........ B60Q 11/00; B60Q 11/005; B60Q 1/04; B60Q 1/1415; B60Q 1/2607
 See application file for complete search history.

(56) References Cited

U.S. PATENT DOCUMENTS

| | | | |
|---|---|---|---|
| 2011/0204716 A1* | 8/2011 | Abe .................. | B60Q 1/382 307/10.8 |
| 2011/0204885 A1* | 8/2011 | Le Goff ............. | B60Q 11/005 324/244 |
| 2012/0248982 A1* | 10/2012 | Liao .................. | H05B 45/10 315/77 |
| 2016/0097822 A1 | 4/2016 | Hopfgartner | |
| 2017/0016586 A1* | 1/2017 | Tsuda ................ | F21S 41/321 |
| 2017/0174120 A1* | 6/2017 | Sassoon ............. | B60Q 1/04 |

\* cited by examiner

DEVICE AND METHOD FOR CONTROLLING LIGHT SOURCES IN MOTOR VEHICLES

TECHNICAL FIELD

The present invention relates to the field of lighting devices for motor vehicles. More specifically, the invention relates to devices and methods for controlling activation and/or deactivation of light sources.

STATE OF THE ART

Automotive lamps and the light sources thereof are subject to strict homologation tests in order to certify that both the lamps and the light sources meet certain lighting requirements. In this sense, different parameters are measured in relation to the light provided by the automotive lamps, for example, the intensity of the light, the color, etc.

As a motor vehicle has a plurality of automotive lamps and light sources, when two or more light sources are active at the same time the light that one light source produces may affect the light produced by another light source/s. Particularly, the visual perception of the lights may change as the intensities and the colors thereof get mixed up, so the light from each light source becomes different from how it is originally perceived (i.e. when no other light sources are active). This issue may become problematic as some lights must meet particular lighting requirements no matter what; these requirements are generally stricter as higher the relevance of the light source is for safe driving. The intensity and the color of the light aside, the variations in visual perception generally become greater the closer the active light sources are one to each other.

Many motor vehicles tend to integrate several light sources within a same automotive lamp, something which results in more compact solutions. Even though the integration of the light sources within a lamp may be used for differentiation between carmakers or vehicle models (and even improve the aesthetics of the vehicle), owing to the reuse or sharing between two or more lighting sources of part or an entirety of the optics, such lamps reduce the aggregate weight of the lighting devices of the vehicle. Albeit this is advantageous, the aforementioned problem is exacerbated.

As it is mandatory that each automotive lamp is homologated, depending on the light configurations allowed by a vehicle or an automotive lamp, passing the homologation tests becomes more difficult since an automotive lamp must pass tests for each of those configurations. That is to say, if a vehicle or an automotive lamp allows having active several light sources or light functions at the same time (e.g. daylight running light function, pilot light function, low beam function, turn indicator function, etc.), the light sources must pass the homologation tests for each of these configurations.

It would be desirable that light sources providing light functions regarded as more important for safe driving prevailed other light sources providing more complementary light functions, and thus the more important ones were provided alone. In other words, it would be desirable that while important light sources are active, complementary light sources are forced to be inactive. Since the complementary light functions may not have to be active at all times, deactivating them while the important light functions are active would ease passing the homologation tests of the corresponding automotive lamps or light sources. Notwithstanding, programming such behavior of the different light sources of a motor vehicle may be costly if existing control modules of a motor vehicle must be reprogrammed.

Therefore, there is an interest in providing a way for selectively activating and deactivating certain light sources (and, thus, light functions) so that other light sources (that may be regarded as being more important for safe driving) are not affected by the light provided by those certain light sources selectively activated/deactivated. Preferably, selectively controlling one or more light sources and corresponding light function/s may be carried out directly from within the automotive lamp comprising the one or more light sources.

DESCRIPTION OF THE INVENTION

The devices and methods of the present disclosure are intended to solve one or more of the aforementioned technical problems.

A first aspect of the invention relates to a device for controlling at least a first light source of a motor vehicle, the motor vehicle at least comprising the first light source being configured to provide a first light function and a second light source configured to provide a second light function, the device comprising electrical means configured to detect activation of the second light source, and to deactivate the first light source after detection of activation of the second light source.

The device is capable of deactivating a first light source that may affect the light provided by a second light source.

While the first light source is active, the driver of a motor vehicle or even the motor vehicle itself may decide to switch on the second light source. Since the second light function may be regarded as an important light function for driving safely (e.g. turn indicator function, braking function, etc.) whereas the first light function may be regarded as a light function of lesser importance or of a complementary nature for driving safely (e.g. daylight running light function, low beam complementary function, auxiliary pilot light function, etc.), the second light function shall have priority over the first light function.

The device may detect, through the electrical means, that the second light source is switched on, and proceed to switch off the first light source through the electrical means.

In order to control at least the first light source, the device may at least receive a first electrical signal corresponding to the active or inactive status of the first light source, a second electrical signal corresponding to the active or inactive status of the second light source, and provide a third electrical signal corresponding to an active or inactive status of the first light source. The third electrical signal provided by the device may be equal to the first electrical signal received by the device; or the third electrical signal may be different to the first electrical signal when the device is modifying the operation of the first light source thereby overriding an operation mode desired by a driver or the vehicle motor.

In some cases, the first light source is within a first automotive lamp and the second light source is within a second automotive lamp, whereas in some other cases both the first and the second light sources are within a same automotive lamp.

In some embodiments of the invention, the electrical means are further configured to detect deactivation of the second light source, and to activate the first light source after detection of deactivation of the second light source.

The device may reactivate the first light source once the second light source has been switched off so as to provide the first light function again. In this sense, the device temporarily deactivates the first light source at least during the time that the second light source is active.

In some embodiments, the electrical means comprise a switch for activating and deactivating the first light source.

When the second light source is activated or deactivated, based on a detection thereof the device may open or close a switch that deactivates or activates the first light source. In this way, when the second light source is active, the switch deactivates the first light source and maintains it deactivated; and after the second light source has been deactivated, the switch activates the first light source and maintains it activated.

During the period in which the second light source is active (and the first light source is not active owing to the control of the device), if the first light source is completely deactivated for example by the driver of the motor vehicle, once the second light source is deactivated, the device may actuate the switch so as to activate the first light source again, however the first light source will not be activated as the driver or the vehicle has already switched it off. That is, the device controls the first light source but does not override the deactivation of the first light source that has been determined by the driver or the vehicle.

In some of these embodiments, the electrical means comprise a timer for delaying activation of the first light source for a time period after detection of deactivation of the second light source.

The device may delay the activation of the first light source so that, if the second light source is activated again right after it has been deactivated, the first light source is not activated unnecessarily (since the second light source will be active again).

In some embodiments of the invention, the motor vehicle further comprises a third light source configured to provide a third light function, and the electrical means are further configured to deactivate the third light source after detection of the activation of the second light source. Preferably, in some of these embodiments, the electrical means are further configured to activate the third light source after detection of the deactivation of the second light source.

The device may deactivate additional light sources that are active and which may affect the light characteristics of the second light source. For example, the device may proceed to deactivate a first light source providing a daylight running light and a third light source providing a low beam complementary light when a second light source providing a turn indicator light is activated.

The device may temporarily deactivate the third light source for at least the time that the second light source is active; afterwards, the device may reactivate the third light source.

The device may at least receive an electrical signal corresponding to the active or inactive status of the third light source, and provide an electrical signal corresponding to an active or inactive status of the third light source as controlled by the device.

In some embodiments, the electrical means comprise an electrical network.

The electrical means may comprise, for example, a printed circuit board in turn comprising the electrical network. The printed circuit board and the electrical network may comprise terminals for receiving electrical signals corresponding to the active or inactive status of the light sources, and terminals for providing electrical signals to the active or inactive status of the light source/s controlled by the device. Further, the electrical network preferably comprises a switch for activating and deactivating the first light source, and a timer for delaying activation of the first light source for a time period after detection of deactivation of the second light source.

In some embodiments, the electrical means comprise a microcontroller.

The microcontroller may be programmed to carry out the aforementioned tasks. To this end, the microcontroller includes input port/s for receiving data regarding the status of at least the first and second light sources, particularly data related to the active or inactive status of the first and second light sources. Also, the microcontroller includes output port/s that allow altering the operation of the light source/s that are controlled by the device, particularly activating and/or deactivating the light source/s by means of electrical signals.

In some embodiments, the device is configured to be included within an automotive lamp.

The device may fit within an automotive lamp and may be configured to electrically connect, either directly or through one or more electrical networks, to at least the first light source so as to control its operation, and to at least the second light source so as to detect activation and deactivation thereof. Therefore, as the device may be included in automotive lamps, no additional space in the motor vehicle is necessary for hosting the device. Further, any modifications, reparations or replacements of the device that may be necessary at some point during its operating life may be carried out by retrieving the automotive lamp only, that is, no access to other parts of the vehicle motor may be necessary.

In preferred embodiments, the first light function is mutually exclusive with the second light function.

In some embodiments, the first light function is a daytime running light function or a low beam complementary function; and the second light function is a turn indicator function.

A second aspect of the invention relates to a lighting device for a motor vehicle, the lighting device comprising: a first light source; a second light source; and a device according to the first aspect of the invention for controlling at least the first light source.

The lighting device may have integrated therein at least the first light source and the second light source together with the device for controlling the first light source. This results in a lighting device that is compact in size and which may feature control of at least the first light source without programming a control module of the motor vehicle.

In some embodiments, the lighting device further comprises an optics device. Further, in these embodiments, the first light source is configured to provide a first light function through a first face of the optics device, and the second light source is configured to provide a second light function through the first face of the optics device.

The lighting device includes optics that are shared by the first and second light sources, something which allows making the lighting device more compact as some components need not be duplicated.

The optics device may include, for example, a light guide, and through one of its faces the first and second light functions are provided towards the exterior of the lighting device. The sharing or reuse of the optics device makes that the light of the different light sources may get mixed up while the light source are in operation simultaneously. To this end, the device controls the operation of at least the first light source (in those embodiments in which the lighting devices comprises a third light source and/or more light sources, the additional light source/s may be controlled by the device as well) so that the light functions that may be regarded as more important for driving safely do not get mixed up with more complementary light functions.

Similar advantages as those described for the first aspect of the invention may also be applicable to the second aspect of the invention.

A third aspect of the invention relates to an automotive lamp comprising a lighting device according to the second aspect of the invention. The automotive lamp is a headlamp or a rearlamp of a motor vehicle.

Similar advantages as those described for any of the first and second aspects of the invention may also be applicable to the third aspect of the invention.

A fourth aspect of the invention relates to a method for controlling at least a first light source of a motor vehicle, the motor vehicle comprising the first light source being configured to provide a first light function and a second light source configured to provide a second light function, the method comprising: electrically detecting activation of the second light source; and electrically deactivating the first light source after detecting activation of the second light source.

By deactivating the first light source after detecting that the second light source has been activated, the light of the second light function does not get mixed up with the light of the first light function. The second light function may have more importance for safe driving (e.g. turn indicator function, braking function, etc.) than the first light function (e.g. daylight running light function, low beam complementary function, pilot light function, etc.). Accordingly, the second light source (together with the corresponding optics) may not require to be designed taking into account that the first light source will be active at the same time since it will be disabled when the second light source is active.

In some embodiments, the method further comprises: electrically detecting deactivation of the second light source; and electrically activating the first light source after detecting deactivation of the second light source.

In some embodiments, a step of electrically activating the first light source after detecting deactivation of the second light source comprises electrically activating the first light source after detecting deactivation of the second light source and after a time delay of a timer has elapsed.

In some embodiments, the method further comprises: electrically deactivating a third light source after detecting activation of the second light source. In these embodiments, the third light source is configured to provide a third light function. Preferably, in some of these embodiments, the method further comprises electrically activating the third light source after detecting deactivation of the second light source.

Additional light sources such as the third light source and/or even a fourth or other light sources, when they are active, may also be deactivated upon activation of the second light source so as not to affect the light function of the second light source. These additional light sources may be activated again once the second light source is deactivated.

In preferred embodiments, the first light function is mutually exclusive with the second light function.

In some embodiments, the first light function is a daytime running light function or a low beam complementary function; and the second light function is a turn indicator function.

Similar advantages as those described for any of the first, second and third aspects of the invention may also be applicable to the fourth aspect of the invention.

A fifth aspect of the invention relates to a device adapted for carrying out a method according to the fourth aspect of the invention.

The device may be, for example, an electrical network adapted for carrying out the method, or a microcontroller adapted for carrying out the method.

Similar advantages as those described for any of the first, second, third and fourth aspects of the invention may also be applicable to the fifth aspect of the invention.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DESCRIPTION OF A WAY OF CARRYING OUT THE INVENTION

Figure 1:
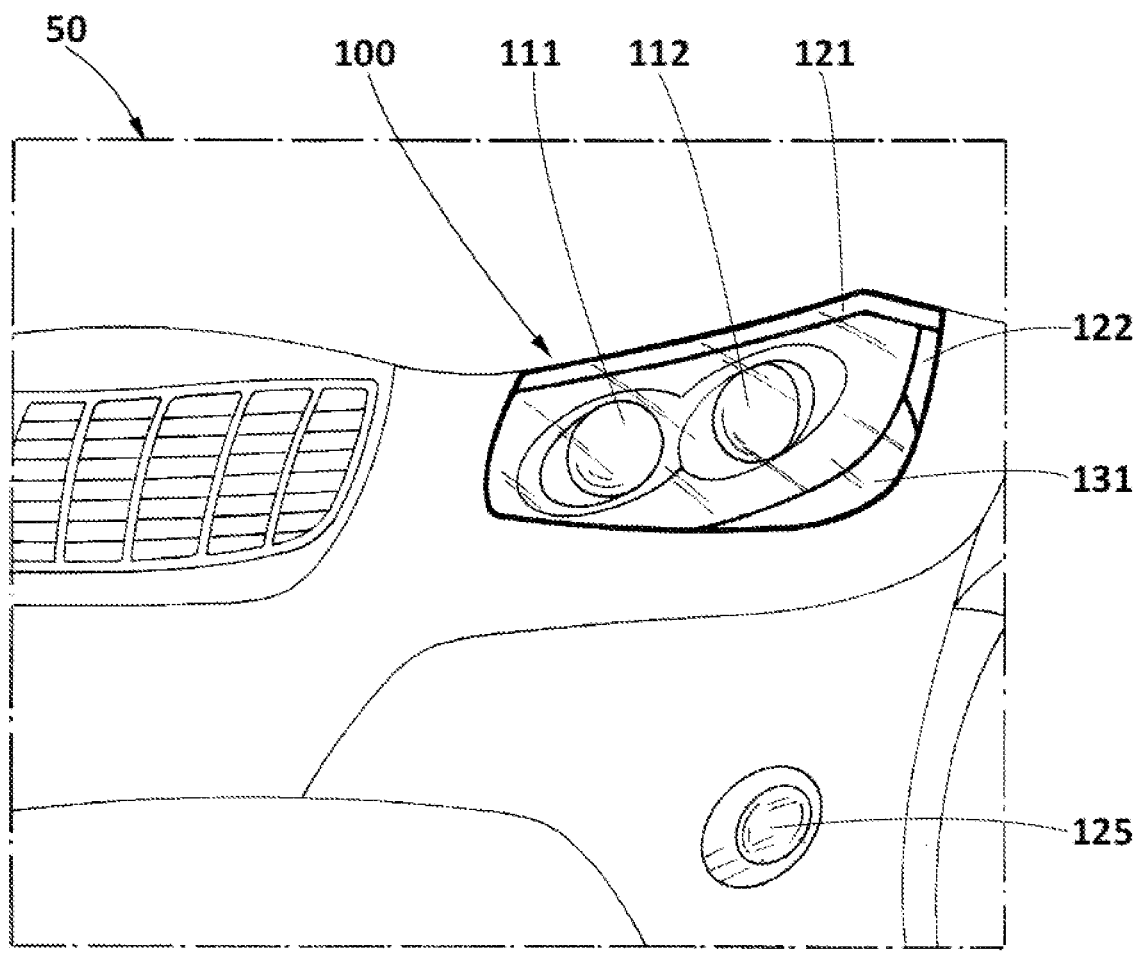
FIG. 1 shows part of the front of a motor vehicle including automotive lamps.

FIG. 1 shows part of the front of a motor vehicle 50. The motor vehicle 50 includes a first automotive lamp 100 and a second automotive lamp 125.

The first automotive lamp 100 comprises a lighting device in turn comprising: a first light source 111 configured to provide a low beam function, a second light source 112 configured to provide a high beam function, a third light source 121 configured to provide a daylight running light function, a fourth light source 122 configured to provide an ambient light function, and a fifth light source 131 configured to provide a turn indicator function. The second automotive lamp 125 comprises a lighting device that comprises a light source configured to provide an auxiliary pilot light function.

When the fifth light source 131 is active, that is, when the turn indicator function is provided, the light produced by other light sources such as the third light source 121, the fourth light source 122, and/or the light source of the second automotive lamp 125 may affect the light characteristics of the light produced by the fifth light source 131. The light functions of any of the third light source 121, the fourth light source 122, and the light source of the second automotive lamp 125 may be regarded as light functions of complementary nature for safe driving, and therefore their deactivation upon activation of the fifth light source 131 may be convenient for not affecting the light produced by the fifth light source 131.

Figure 2:
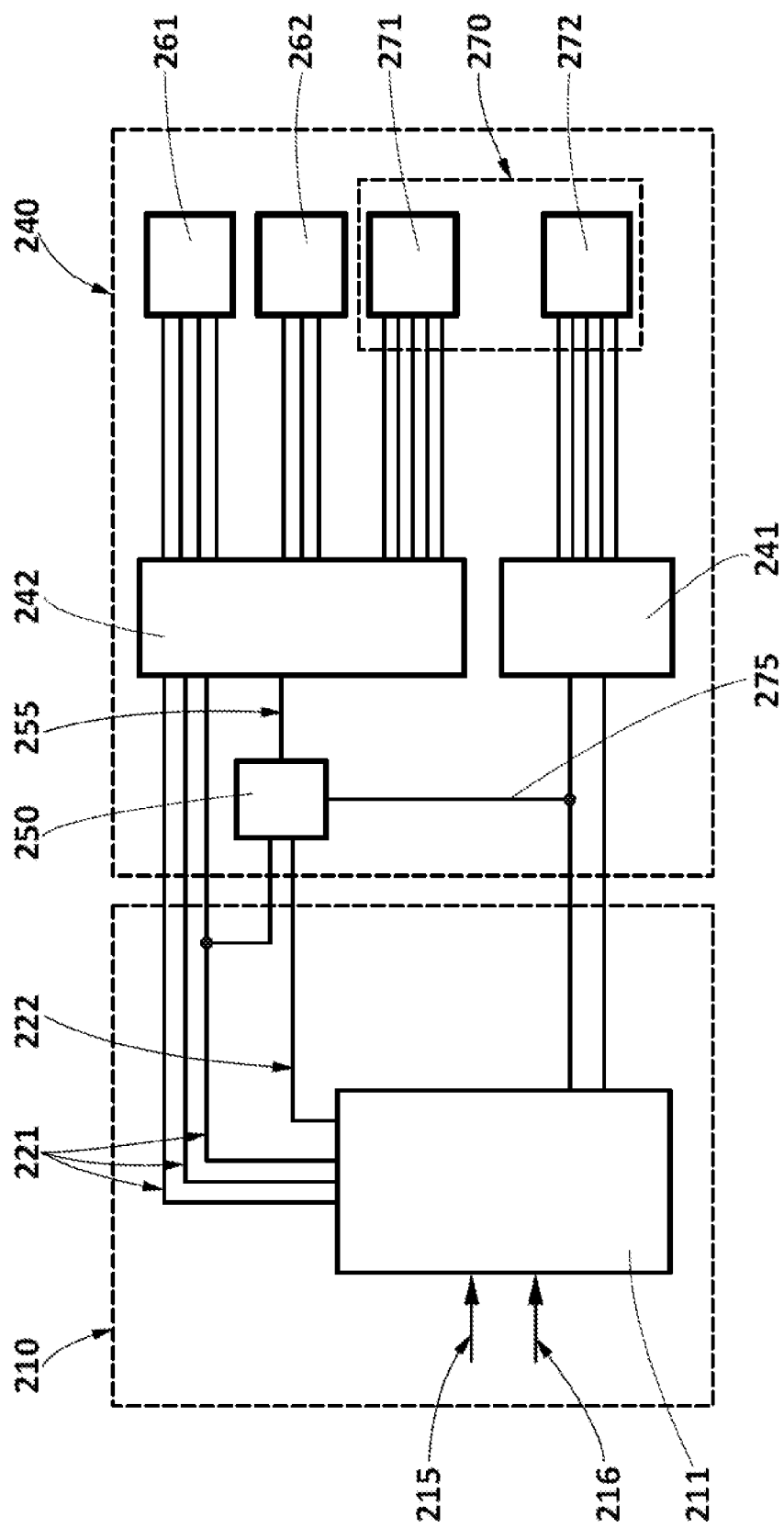
FIG. 2 shows, in a block diagram form, a device in accordance with an embodiment of the invention electrically connected to other parts of a motor vehicle.

FIG. 2 shows, in a block diagram form, a device 250 in accordance with an embodiment of the invention electrically connected to other parts of a motor vehicle. The figure shows only some specific details such as particular electrical connections that are pertinent to understanding embodiments of the present invention so as not to obscure the disclosure with details that are readily apparent to a person skilled in the art upon reading the present disclosure.

The motor vehicle comprises: a control module 211, such as a body control module, configured to control several functions of the vehicle; in this example the control module 211 also controls some light functions of the vehicle. The control module 211 receives supply and control lines 215, 216, and is generally located on a part 210 of the vehicle where other processing devices for controlling the vehicle may be also located. In some cases, the control module 211 may be provided as two or more control modules (that are electrically connected) so as to separate the different functions controlled between the different control modules.

The motor vehicle also comprises an automotive lamp 240, which includes a first light source 261 configured to provide a first light function (e.g. the low beam function of the light source 111 of FIG. 1), a second light source 262 configured to provide a second light function (e.g. the high beam function of the light source 112 of FIG. 1), a third light source 271 configured to provide a third light function (e.g. the daylight running light function of the light source 121 of FIG. 1, the ambient light function of the light source 122 of FIG. 1, the auxiliary pilot light function of the light source of the automotive lamp 125 of FIG. 1, a low beam complementary function, etc.) and a fourth light source 272 configured to provide a fourth light function (e.g. the turn indicator function of light source 131 of FIG. 1); in this example, the third and fourth light sources 271, 272 are provided within a same lighting module 270. For a better understanding of the invention of the present disclosure, by way of example it is considered that the fourth light source 272 is configured to provide an important light function such as a turn indicator function, whereas the third light source 271 is configured to provide a complementary or less important light function such as a daylight running light function or a low beam complementary function.

The automotive lamp 240 also comprises a first driver module 241 and a second driver module 242 for electrically powering the first, second, third and fourth light sources 261, 262, 271, 272. To this end, the first driver module 241 receives electrical conductors from the control module 211 (including an electrical conductor 275 corresponding to a desired operation—enabled operation, disabled operation, or enabled operation with a regulated level of illumination—of the fourth light source 272), and provides electrical conductors to the fourth light source 272 so as to adjust its operation. In this particular example, the electrical conductor 275 provides an electrical signal indicative of whether the turn indicator function is active or inactive.

On the other hand, the second driver module 242 receives electrical conductors 221 and 225 that, among others, correspond to an operation (e.g. enabled or disabled operation) of the third light source 271, and provides electrical conductors to the first, second and third light sources 261, 262, 271 so as to adjust the operation of each. In this particular example the electrical conductor 225 at least transmits electrical signals relative to whether the daylight running light function or the low beam complementary function is active or inactive as controlled by the device 250. In some cases, the first driver 241 and the second driver module 242 are integrated in a single driver module.

Owing to the device 250, which receives electrical conductors 222 relative to the operation of at least the third light source 271 (for example with electrical signals that are modulated with a pulse width modulation), the third light source 271 may be controlled so as to be deactivated (and, in some embodiments, activated as well) depending on the operation of the fourth light source 272. To this end, the device 250 also receives the electrical conductor 275 relative to the status of the fourth light source 272 (the turn indicator function). The device 250 outputs electrical signals through the electrical conductor 225 that is electrically connected to the second driver module 242, and with said electrical signals the device 250 controls the operation of the third light source 271.

Further, the first and/or second driver modules 241, 242 may provide, for example, electrical conductors (not illustrated) to the control module for transmitting electrical signals for diagnostics purposes of any of the light sources 261, 262, 271, 272.

Figure 3:
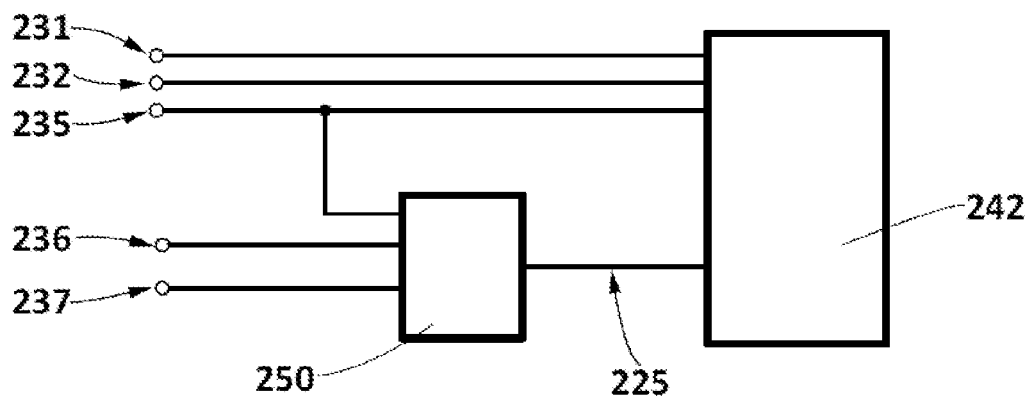
FIG. 3 shows part of the diagram of FIG. 2 focusing on the device of the present disclosure.

FIG. 3 shows part of the diagram of FIG. 2 focusing on the device 250.

The device 250 is configured to receive electrical conductors 235-237 respectively corresponding to a power line of the third light source 271, a signal line of the operation of the third light source 271, and a signal line of the operation of the fourth light source 272. The device 250 is configured to provide electrical signals to one or more outputs configured to receive connection of electrical conductors 225.

The second driver module 242 is configured to receive electrical conductors 231, 232, 225 respectively corresponding to a power line of the first and second light sources 261, 262, a selection signal line of the first and second light sources 261, 262, and a signal line of the operation of the third light source 271 as adjusted by the device 250.

Figure 4:
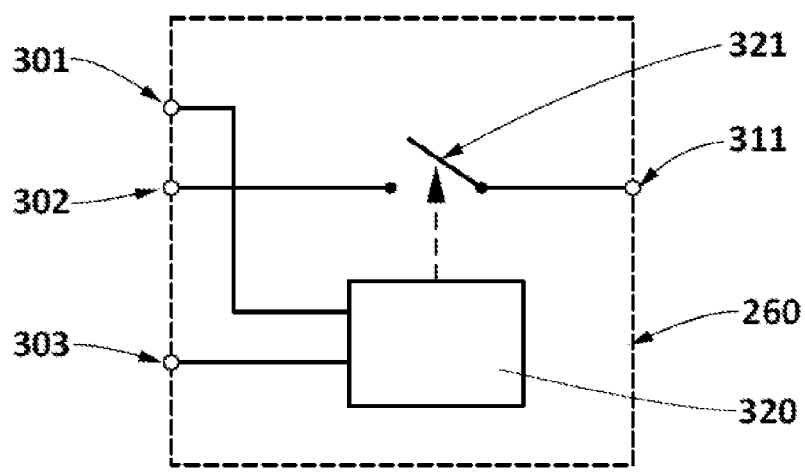
FIG. 4 shows, in a schematic manner, a device in accordance with an embodiment of the invention.

FIG. 4 shows, in a schematic manner, a device 260 in accordance with an embodiment of the invention.

The device 260 (which may be used as the device 250 of FIGS. 2-3) comprises: first, second and third terminals 301-303 for receiving connection of three electrical conductors (for example the electrical conductors 221, 222, 275 of FIG. 2 or the electrical conductors 235-237 of FIG. 3); and a fourth terminal 311 for providing electrical signals relative to the control of the operation of the third light source 271 (for example through the electrical conductor 225 of FIGS. 2-3). The device 260 further comprises electrical means in turn comprising a control unit 320 and a switch 321. In some embodiments, the control unit 320 includes an electrical network.

The control unit 320 receives, in the first and third terminals 301, 303, a power line of the third light source 271 and a signal line of the operation of the fourth light source 272, respectively, in order to deactivate the third light source 271. After detecting activation of the fourth light source 272, the control unit 320 actuates the switch 321 so that, irrespective of what is inputted at the second terminal 302 (the electrical signal relative to the operation of the third light source 271), the electrical signal outputted at the fourth terminal 311 corresponds to to the deactivation of the third light source 271 (with an electric potential that depends on the particular light source, and may be for example a ground potential).

In some embodiments, the control unit 320 (and thus the device 260) is further configured to activate the third light source 271 (if it was active when the fourth light source 272 was activated or if the driver of the motor vehicle decided to activate it while the fourth light source 272 is active) after deactivation of the fourth light source 272. To this end, the control unit 320 actuates the switch 321 after detecting deactivation of the fourth light source 272 so as to electrically connect the second terminal 302 with the fourth terminal 311. Therefore, if the third light source 271 is not active according to the electrical signal arriving at the second terminal 302, the third light source 271 will not be active either when the control unit 320 actuates the switch 321.

In some embodiments, the control unit 320 comprises a microcontroller configured to perform the aforementioned functions. In some other embodiments, the electrical means of the device 260 may alternatively comprise a microcontroller configured to perform the functions described in the present disclosure.

Figure 5:
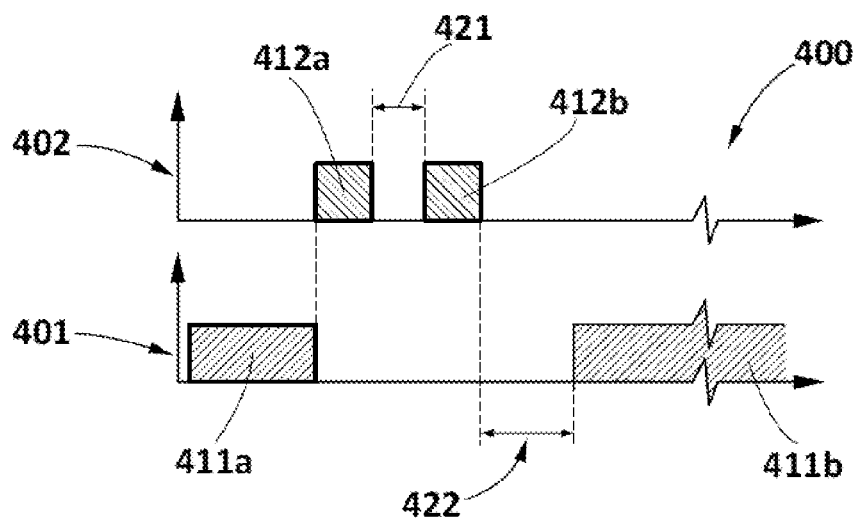
FIG. 5 shows a time evolution of two different light functions when a device in accordance with an embodiment of the invention controls one of the two light sources.

FIG. 5 shows a time evolution 400 of two different light functions 401, 402 when a device in accordance with an embodiment of the invention controls one of the two light sources. In this example, a first light source provides the first light function 401 that is a daylight running light function, and a second light source provides the second light function 402 that is a turn indicator function.

A device in accordance with an embodiment of the present disclosure controls the operation of the first light source based on the operation of the second light source. In this sense, while the first light function 401 is first active (as shown with step 411a), the second light function 402 is not active. At some point, the driver decides to switch on the second light source so as to provide the second light function 402 (as shown with step 412a); the device, upon detecting that the second light function 402 has been activated, deactivates the first light source and hence the first light function 401.

As the second light function 402 corresponds to a turn indicator function, it features an intermittence with an inactive state having a duration $T_{off}$ 421. During that inactive state, the device does not activate the first light source back again since this may produce confusion to other drivers. After the inactive state, the second light source produces light according to the second light function 402 (as shown with step 412b).

Then, the driver decides to switch off the turn indicator function, something which the device controlling the first light source may detect. In preferred embodiments the device does not switch on the first light source immediately after deactivation of the second light source, and waits for a time period of duration 422. In some examples, the duration 422 comprises the duration $T_{off}$ 421, and may also comprise a time delay so as to ensure that the second light function is not switched on again by the driver or the motor vehicle. The time delay may be configured to, for instance but without limitation, a value lower than or equal to 1 millisecond, a value between 1 millisecond and 1 second (e.g. 100 ms, 500 ms, 800 ms, etc.), or a value greater than or equal to 1 second (e.g. 1.5 s, 2 s, 2.5 s, etc.). The time delay may be preferably selected based on the characteristics of the light function monitored by the device in order to control another light source.

Once the time period (of duration 422) has elapsed, the device may activate the first light source so that it may provide the first light function 401 again (as illustrated with step 411b).

Figure 6:
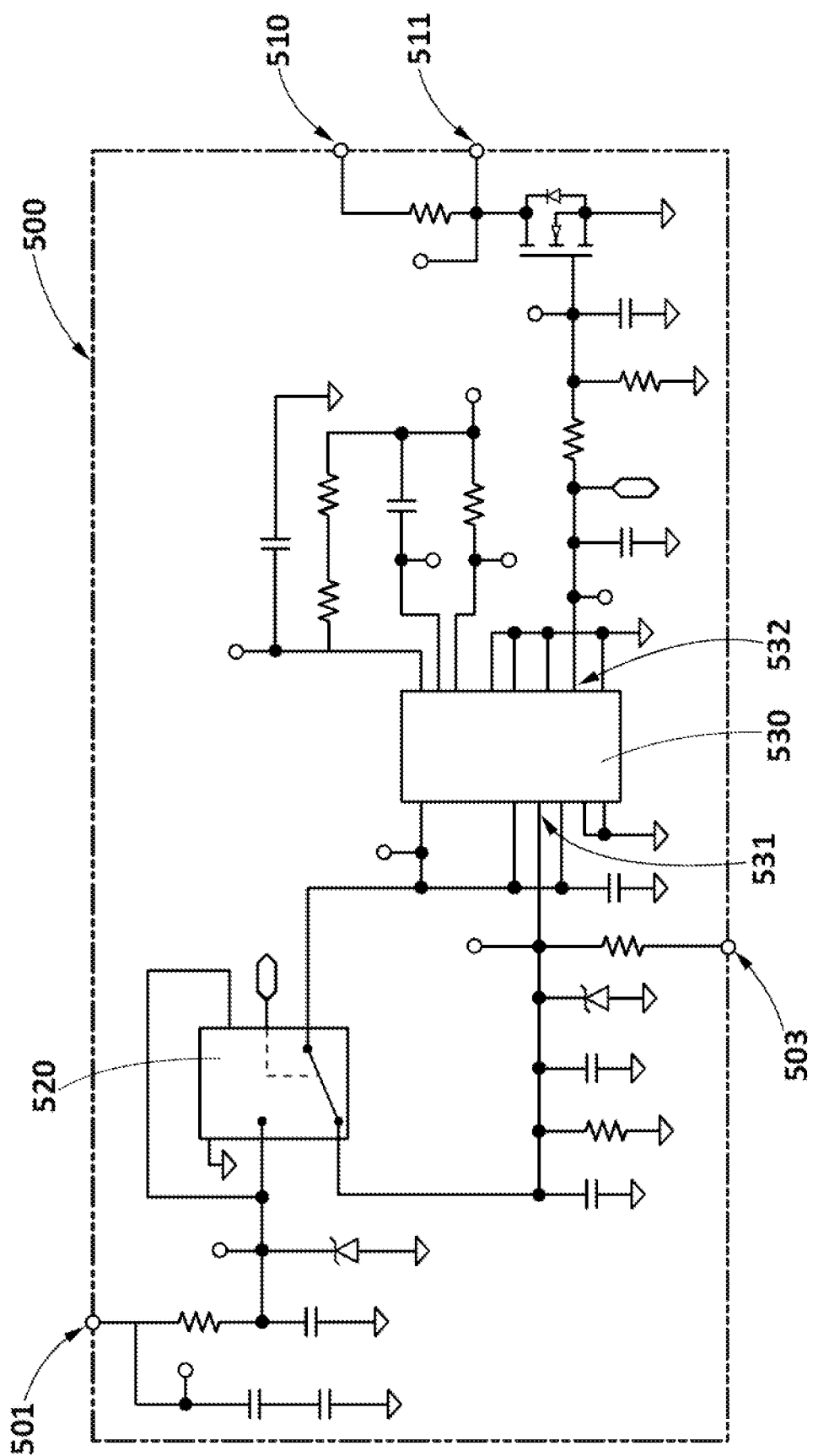
FIG. 6 shows an electrical network suitable for a device in accordance with an embodiment of the invention.

FIG. 6 shows an electrical network 500 suitable for a device in accordance with an embodiment of the invention.

The electrical network 500 comprises a first terminal 501, a second terminal 503, a third terminal 510, and a fourth terminal 511. The first terminal 501 receives a power line of a first light source that may be controlled with the device comprising the electrical network 500. The second terminal 503 receives a signal line providing electrical signals indicative of the operation of a second light source; based on the operation of the second light source the device controls the first light source. The third terminal 510 receives a signal line providing electrical signals indicative of the operation of the first light source as desired by the driver or the motor vehicle itself, that is, the electrical signal indicates whether the first light source should be active or inactive based on the input of the driver or the motor vehicle. The fourth terminal 511 provides a signal line providing electrical signals for controlling the first light source.

The electrical network 500 comprises a 2-channel multiplexer 520 integrated circuit and a timer 530 integrated circuit. The multiplexer 520 electrically connects either the first terminal 501 or the second terminal 503 to the timer 530 (at least to an input terminal thereof for electrically powering the integrated circuit). The second terminal 503 is electrically connected to a master reset input 531 of the timer 530 so as to activate or not the timer 530 depending on the active or inactive operation of the second light source. At an output 532 of the timer 530 electrical signals for adjusting the operation of the first light source are provided; the fourth terminal 511 is electrically connected to the output 532 of the timer 530 so as to provide the electrical signals thereof.

The timer 530 varies the electrical signal at the output 532 depending on the operation of the second light source as indicated by the electrical signals provided in the second terminal 503. The activation of the first light source after the second light source has been deactivated may be delayed by adjusting the different resistors and capacitors connected at some pins of the timer 530 (thereby providing a delay such as the time delay of duration 422 of FIG. 5).

When the electrical signal of the second terminal 503 is in a low state, the timer 530 may be powered from the first terminal 501 by selecting in the multiplexer 520 the channel of the first terminal 501. And when the electrical signal of the second terminal 503 is in a high state, the timer 530 may be powered from the second terminal 503 by selecting in the multiplexer 520 the channel of the second terminal 503; further, this also improves a synchronization between the second terminal 503 and the timer 530 with regards to the deactivation signal of the second terminal 503.

It is readily apparent that the electrical network 500 may be implemented in different ways without departing from the scope of the present disclosure. It is also readily apparent to the person skilled in the art that some details have been omitted in the figures, for example additional electrical conductors or ground terminals for grounding the different blocks illustrated in FIGS. 2-4.

Even though the terms first, second, third, etc. have been used herein to describe several components or entities, it will be understood that the components or variables should not be limited by these terms since the terms are only used to distinguish one component or entity from another. For example, the first light source could as well be named second light source and the second light source could be named first light source without departing from the scope of this disclosure.

In this text, the term "comprises" and its derivations (such as "comprising", etc.) should not be understood in an excluding sense, that is, these terms should not be interpreted as excluding the possibility that what is described and defined may include further elements, steps, etc.

The invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A device for controlling at least a first light source of a motor vehicle, the motor vehicle at least comprising the first light source being configured to provide a first light function and a second light source configured to provide a second light function, the device comprising:

an electrical circuit configured to detect activation of the second light source, and to, irrespective of a signal to activate the first light source, deactivate the first light source after detection of activation of the second light source, and activate the first light source after detecting deactivation of the second light source, wherein the electrical circuit includes a timer configured to delay activation of the first light source by a predetermined amount of time after deactivation of the second light source.

2. The device according to claim 1, wherein the electrical circuit is configured to deactivate the first light source via a switch.

3. The device according to claim 2, wherein the switch is disposed is a signal path of an activation signal to the first light source.

4. The device according to claim 1, wherein the electrical circuit is further configured to deactivate a third light source after activation of the second light source, and to activate the third light source after deactivation of the second light source, the third light source providing a light function different from light functions of the first and second light sources.

5. The device according to claim 1, wherein the device is included in an automotive lamp.

6. The device according to claim 5, wherein the automotive lamp is a headlamp or a rearlamp.

7. The device according to claim 1, wherein the first light sources is configured to provide a daytime run light function or a low beam complementary function.

8. The device according to claim 1, wherein the electrical circuit includes a multiplexer configured to electrically connect one of a power line of the first light source and a power line the second light source to the timer.

9. The device according to claim 1, wherein the second light source is configured to provide a turn indicator function.

10. A method of controlling a first light source of a motor vehicle, the motor vehicle including the first light source and a second light sources, the method comprising:

detecting, with an electrical circuit, activation of the second light source;

deactivating, with the electrical circuit and irrespective of a signal to activate the first light source, the first light source after detection of activation of the second light source; and delaying activation of the first light source for a predetermined amount of time after deactivation of the second light source.

11. The method according to claim 10, further comprising:

deactivating a third light source upon detection of the activation of the second light source; and activating the third light source upon detection of deactivation of the second light source, wherein the third light source provides a different light function than the first and second light sources.

12. The method according to claim 10, wherein deactivating the first light source includes opening a switch in an activation signal path of the first light source.

13. The method according to claim 10, further comprising activating the first light source after deactivation of the second light source.

14. The method according to claim 10, wherein the first and second light sources are included in a headlamp or a rearlamp.

* * * * *